United States Patent [19]
Henderson

[11] Patent Number: 6,051,840
[45] Date of Patent: Apr. 18, 2000

[54] INFRARED HEAT EMITTING DEVICE

[75] Inventor: Jeffrey B. Henderson, Gray, Ga.

[73] Assignee: Heatmax, Inc., Dalton, Ga.

[21] Appl. No.: 09/080,098

[22] Filed: May 18, 1998

[51] Int. Cl.⁷ .................. B64F 1/18; G08G 5/02
[52] U.S. Cl. .................. 250/504 R; 250/493.1; 250/494.1; 250/495.1
[58] Field of Search ............ 250/504 R, 493.1, 250/494.1, 495.1; 340/945, 947, 953

[56] References Cited

U.S. PATENT DOCUMENTS

| | | | |
|---|---|---|---|
| 2,609,437 | 9/1952 | Garbell | 177/352 |
| 3,128,969 | 4/1964 | Yost | 244/98 |
| 3,519,984 | 7/1970 | Zychal | 340/25 |
| 3,837,281 | 9/1974 | Shaffer et al. | 102/35 |
| 4,267,989 | 5/1981 | Skaggs | 244/31 |
| 4,862,164 | 8/1989 | Croley et al. | 340/952 |
| 4,945,248 | 7/1990 | Farr | 250/493.1 |
| 5,129,323 | 7/1992 | Park | 102/293 |
| 5,282,589 | 2/1994 | Branigan et al. | 244/114 R |

*Primary Examiner*—Edward P. Westin
*Assistant Examiner*—Nikita Wells
*Attorney, Agent, or Firm*—Walter A. Rodgers

[57] ABSTRACT

An infrared heat emitting device comprising a container having a bottom, end and side walls extending upwardly from the bottom, a top rotatably interconnected with one of the walls and disposed remote from the bottom, insulation material disposed on the interior of the container, and a heat bag disposed intermediate the top and at least a portion of the insulation whereby infrared heat is emitted through the top.

10 Claims, 2 Drawing Sheets

INFRARED HEAT EMITTING DEVICE

BACKGROUND OF THE INVENTION

In a conventional military operation, helicopters, such as the AH-64, are widely utilized and, in remote landing zones, arrive in darkness. The copilot gunner, sitting in the front seat of the helicopter, assists the command pilot, sitting in the rear seat, in landing the aircraft on the proper site by giving him verbal directions. Specifically the copilot gunner utilizes night-vision goggles to view a lighted inverted "y" configuration on the ground which is formed by using chemical sticks or flammable bean bags. The heat emitted by these devices is insufficient for the command pilot, using a conventional pilot night vision system, to view the inverted "Y" because he is sitting in the second or rear seat.

In tactical situations, such as during Desert Storm, in order to generate additional heat, one of the expedients includes filling coffee cans with jet fuel-soaked sand and then setting them on fire. As the helicopters approach the landing zone, the fires are extinguished leaving a heat signature sufficient to be viewed by the command pilot using the pilot night vision system. Clearly this practice is inefficient and even dangerous.

SUMMARY OF THE INVENTION

A closed container having a bottom, side and end walls upstanding therefrom and a top, multiple apertures formed in at least one of the walls of the container, the interior of the container being partially insulated, an air-activated heat bag disposed intermediate to the insulation and the top for the purpose of emitting heat through the top.

DESCRIPTION OF THE PREFERRED EMBODIMENT

Figure 1:
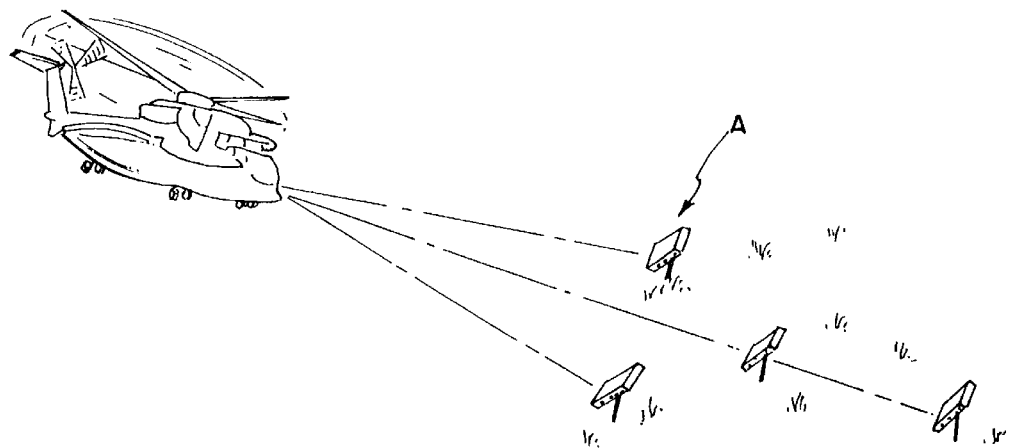
FIG. 1 is a perspective view showing the infrared heat emitting device in actual operation.
Figure 2:
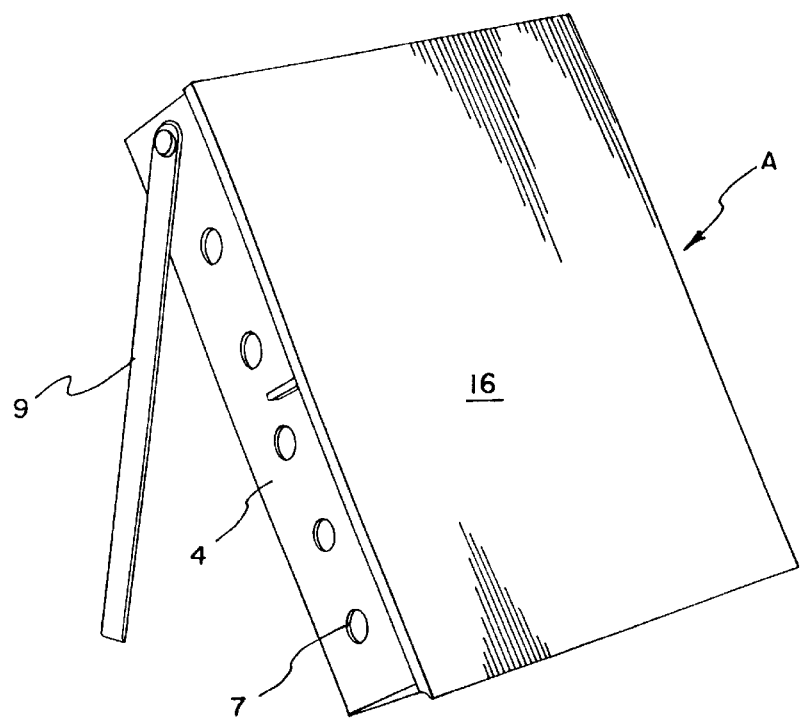
FIG. 2 is a perspective view of the device.
Figure 3:
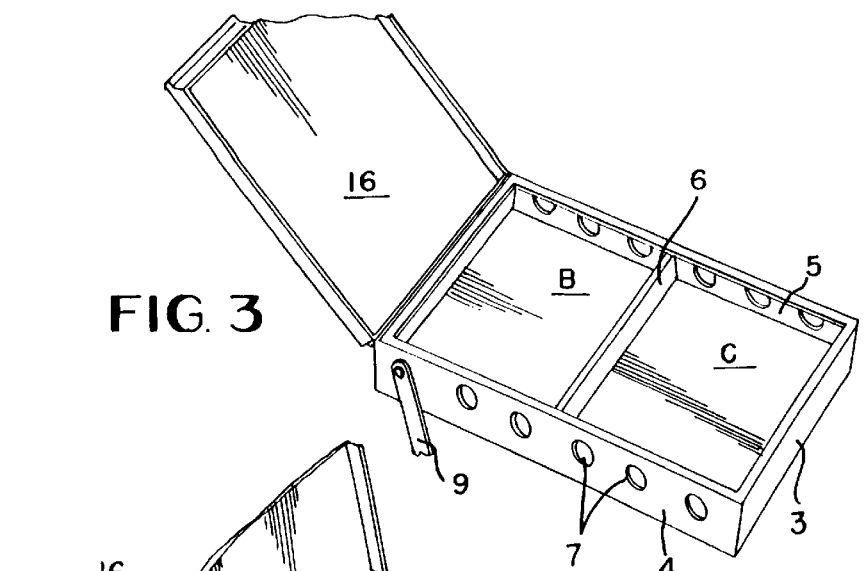
FIG. 3 is a view of the device with the top in the open position.
Figure 4:
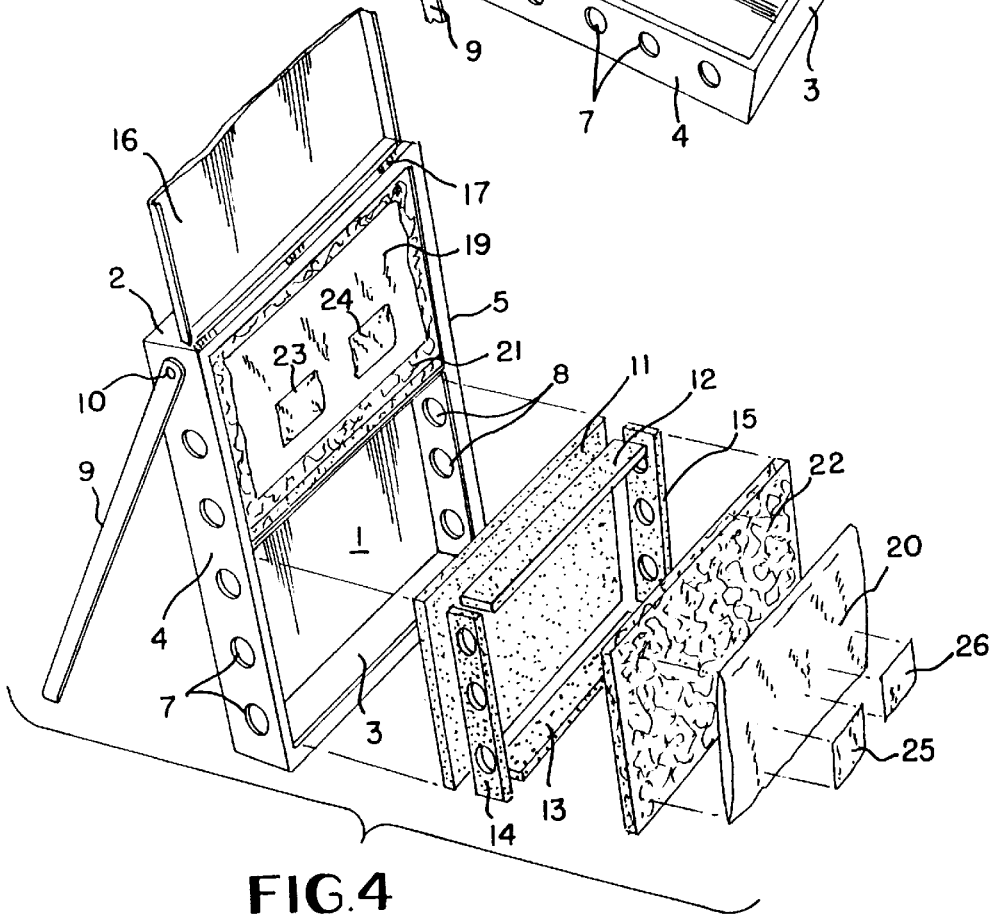
FIG. 4 is an exploded view of the device shown in FIG. 2.

In the drawings, the letter A generally designates the container element for the infrared heat emitting device according to this invention. More specifically, container A comprises bottom 1 to the end edges of which end walls 2 and 3 are integrally joined. In like manner, side walls 4 and 5 are integrally joined to the side edges of bottom 1. To complete the basic structure of container A, the end edges of side walls 4 and 5 are integrally joined to the respective end edges of end walls 2 and 3. Divider 6 is interposed between and attached to the inner surfaces of side walls 4 and 5 to form compartments B and C.

For the purpose of ventilation and enhancing air flow, multiple apertures 7 are formed in side wall 4 and, similarly, multiple apertures 8 are formed in side wall 5. In order to provide means for tilting container A to the optimum viewing angle, bar 9 is provided and is connected to side wall 4 by means of pivot pin 10. Although not shown in detail in the drawings, a similar bar is provided on the other side of container A and is pivotally secured to side wall 5.

For the purpose of providing thermal insulation for the interior of container A, multiple flat insulation panels are provided in the form of panel 11 which is secured in flat face contacting with the interior surface of the compartment C portion of bottom 1. Similarly, insulation panel 12 is secured in flat face contacting relation to one side of divider 6 and insulation panel 13 is secured in flat face contacting relation with the inner surface of end wall 3. Also, insulation panels 14 and 15 are secured to the inner surfaces respectively, of side walls 4 and 5. Of course, appropriate apertures are formed in insulation panels 14 and 15 to correspond to the associated apertures 7 and 8 in side walls 4 and 5. Similar thermal insulation is provided in connection with compartment B.

Figure 5:
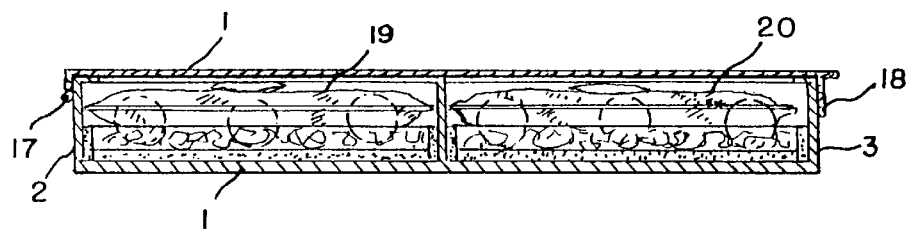
FIG. 5 is a side-elevational view of the device with one side wall broken away.

To complete container A, top 16 is provided and is pivotally interconnected to container A by means of hinge means 17. For the purpose of securing top 14 in closed position, as shown in FIG. 5, conventional lock 18 is provided.

In order to provide the infrared heat emitting feature of this invention, air-activated heat bags 19 and 20 are disposed in compartments B and C, respectively, and overlay associated air-permeable separator panels 21 and 22. Separator panels 21 and 22 act to increase the supply of air to heat bags 19 and 20. In actual operation, heat bags 19 and 20 reach a temperature range of 140 to 180 degrees F. for a period of at least four (4) hours. The wave length band of light is in the range of 6–12 microns which is viewable using the pilot night vision system.

Since it takes approximately 30 minutes for heat bags 19 and 20 to reach the desired operational temperature, auxiliary rapid-heat bags 23 and 24 are placed on the upper surface of heat bag 19 and, likewise, auxiliary rapid-heat bags 25 and 26 are placed on the upper surface of heat bag 20. Auxiliary bags 23–26 are more porous than heat bags 19 and 20 thereby having the capacity to reach operational temperature quickly, specially they reach approximately 190 degrees F. in approximately 2–5 minutes. By this means the heating process of heat bags 20 and 21 is accelerated.

The heat engendered by bags 19, 20 and 23–26 results from the controlled rusting of iron which chemically is hydrated ferric oxide resulting from the combination of iron, oxygen and water. The process is exothermic in that it produces heat when these elements are combined to form rust. The combination of iron, oxygen and water to produce rust exotherm is utilized for purposes of safety, economy and simplicity of use. Of course, other combinations of inorganic elements or organic combinations with water and oxygen will produce an exothermic reaction. The intensity of the temperature is controlled by varying the porosity of the bags themselves and the resultant availability of oxygen to the other reactants. By increasing the porosity, the flow of oxygen is enhanced thereby accelerating the rusting process resulting in a rise in temperature of the heat bags.

Generally, container A is constructed of heavy sheet metal in order to remain stabilized and resist the effects of rotor wash during the helicopter landing operation. Top 16 is constructed of light gauge sheet metal or aluminum in order to enhance the transference of heat from bags 19 and 20 to top 16. The entire container is painted flat black which aids in absorbing and transmitting heat through top 16.

During an actual military operation, containers A are positioned in an inverted "Y" shaped configuration as shown in FIG. 1. The thermal insulation in containers B and C aids in directing heat from air-activated heat bags 19 and 20 to top 16.

Therefore, by this invention, a helicopter command pilot is able to view a desired landing zone without relying on verbal directions from the copilot gunner. The device is safe, reusable and highly effective under operational conditions. This invention is also applicable to other situations in which a point of interest is to be identified using thermal imaging techniques, such as in the case of motor vehicles, missiles and satellites.

What is claimed is:

1. An infrared heat emitting device comprising a bottom, multiple walls secured to said bottom wall and upstanding therefrom to form a container, a top rotatable interconnected to one of said walls remote from said bottom, at least one air-activated heat bag disposed in said container, and at least one aperture formed in one of said walls.

2. A device according to claim 1 wherein said bottom and said walls have inner surfaces and wherein insulation is disposed in flat face contacting relation with the inner surface of said bottom.

3. A device according to claim 2 wherein insulation is disposed in flat face contacting relation with the inner surface of at least one of said walls.

4. A device according to claim 1 wherein a divider is disposed intermediate two of said walls to form two compartments in said container.

5. A device according to claim 1 wherein multiple apertures are disposed in two of said walls disposed opposite each other.

6. A device according to claim 1 wherein at least one bar is pivotally interconnected to one of said walls for the purpose of positioning said device in an operational disposition.

7. A device according to claim 1 wherein said heat bag is operable within the 140–180 degrees F. range.

8. A device according to claim 1 wherein an air-permeable separator panel is disposed intermediate said bottom and said heat bag.

9. A device according to claim 1 wherein an auxiliary heat bag is disposed intermediate said heat bag and said top.

10. A device according to claim 1 wherein a lock is interconnectable between said top and one of said walls.

* * * * *